United States Patent
Testar et al.

(10) Patent No.: US 11,436,878 B2
(45) Date of Patent: Sep. 6, 2022

(54) METHOD FOR DETERMINING THE SEVERITY OF A POSSIBLE COLLISION BETWEEN A MOTOR VEHICLE AND ANOTHER VEHICLE, CONTROL APPARATUS, DRIVER ASSISTANCE SYSTEM AND A MOTOR VEHICLE

(71) Applicant: Valeo Schalter und Sensoren GmbH, Bietigheim-Bissingen (DE)

(72) Inventors: Miquel Testar, Bietigheim-Bissingen (DE); Malik Waqas, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 506 days.

(21) Appl. No.: 15/759,042

(22) PCT Filed: Sep. 5, 2016

(86) PCT No.: PCT/EP2016/070813
§ 371 (c)(1),
(2) Date: Sep. 2, 2020

(87) PCT Pub. No.: WO2017/042118
PCT Pub. Date: Mar. 16, 2017

(65) Prior Publication Data
US 2021/0142597 A1 May 13, 2021

(30) Foreign Application Priority Data
Sep. 9, 2015 (DE) .................. 10 2015 115 135.9

(51) Int. Cl.
*G01S 13/931* (2020.01)
*B60R 21/0134* (2006.01)
(Continued)

(52) U.S. Cl.
CPC ......... *G07C 5/0841* (2013.01); *B60N 2/0276* (2013.01); *B60R 21/0132* (2013.01);
(Continued)

(58) Field of Classification Search
CPC ...... G07C 5/0841; G07C 5/02; B60N 2/0276; B60R 21/0132; B60R 2021/01272;
(Continued)

(56) References Cited

U.S. PATENT DOCUMENTS 5,745,870 A  4/1998 Yamamoto et al.
5,826,216 A * 10/1998 Lyons .................. G01S 13/931
                                                     702/143
(Continued)

FOREIGN PATENT DOCUMENTS

DE   199 33 782 A1   1/2001
DE   102 58 162 A1   7/2003
(Continued)

OTHER PUBLICATIONS

International Search Report issued in PCT/EP2016/070813 dated Dec. 2, 2016 (3 pages).
(Continued)

*Primary Examiner* — Vivek D Koppikar
*Assistant Examiner* — Kathleen B Ward
(74) *Attorney, Agent, or Firm* — Osha Bergman Watanabe & Burton LLP

(57) ABSTRACT

A method for determining the severity of a possible collision between a motor vehicle and another vehicle is disclosed. Sensor data which describes the other vehicle is received from at least one sensor of the motor vehicle by means of a control apparatus, a change in velocity which describes a difference between a velocity (V1) of the motor vehicle before the collision and a collision velocity (Vc) of the motor vehicle (1) after the collision is determined on the
(Continued)

basis of the sensor data, and the severity of the possible collision is determined on the basis of the determined change in velocity, wherein a mass (m2) of the other vehicle is estimated by means of the control apparatus on the basis of the sensor data, and the severity of the possible collision is additionally determined on the basis of the estimated mass (m2).

12 Claims, 3 Drawing Sheets

(51) Int. Cl.
*G07C 5/08* (2006.01)
*B60N 2/02* (2006.01)
*B60R 21/0132* (2006.01)
*B60W 10/18* (2012.01)
*B60W 10/30* (2006.01)
*G07C 5/02* (2006.01)
*B60R 21/01* (2006.01)

(52) U.S. Cl.
CPC ............ *B60W 10/18* (2013.01); *B60W 10/30* (2013.01); *G01S 13/931* (2013.01); *G07C 5/02* (2013.01); *B60R 2021/01272* (2013.01); *B60W 2420/52* (2013.01); *B60W 2710/18* (2013.01); *B60W 2710/30* (2013.01); *G01S 2013/9323* (2020.01); *G01S 2013/9324* (2020.01); *G01S 2013/93272* (2020.01); *G01S 2013/93274* (2020.01)

(58) Field of Classification Search
CPC ... B60R 21/0134; B60W 10/18; B60W 10/30; B60W 2420/52; B60W 2710/18; B60W 2710/30; G01S 13/931; G01S 2013/9323; G01S 2013/9324; G01S 2013/93272; G01S 2013/93274; G01S 2013/932; G01S 13/878
See application file for complete search history.

(56) References Cited

U.S. PATENT DOCUMENTS

| | | | | |
|---|---|---|---|---|
| 6,085,151 | A * | 7/2000 | Farmer | G01S 7/0232 |
| | | | | 701/301 |
| 6,775,605 | B2 | 8/2004 | Rao et al. | |
| 2002/0099485 | A1* | 7/2002 | Browne | G01S 13/86 |
| | | | | 701/45 |
| 2004/0061598 | A1* | 4/2004 | King | B60R 21/013 |
| | | | | 340/435 |

FOREIGN PATENT DOCUMENTS

| | | | | |
|---|---|---|---|---|
| DE | 103 17 637 A1 | 11/2004 | | |
| DE | 10317637 A1 * | 11/2004 | ............. | B60N 2/888 |
| DE | 103 54 035 A1 | 6/2005 | | |
| DE | 10 2004 062 497 A1 | 7/2006 | | |
| DE | 10 2005 006 763 A1 | 8/2006 | | |
| DE | 102005035415 A1 * | 2/2007 | ......... | B60R 21/0134 |
| DE | 10 2006 002746 A1 | 7/2007 | | |
| DE | 102006002746 A1 * | 7/2007 | ......... | B60R 21/0132 |
| DE | 10 2007 047404 A1 | 4/2009 | | |
| DE | 10 2008 038 062 B3 | 6/2010 | | |
| DE | 10 2009 025 021 A1 | 12/2010 | | |
| DE | 10 2009 046 057 A1 | 5/2011 | | |
| DE | 10 2012 024 849 A1 | 6/2014 | | |
| DE | 10 2013 220 784 A1 | 4/2015 | | |
| DE | 10 2014 200 813 A1 | 7/2015 | | |
| DE | 10 2014 000842 A1 | 7/2015 | | |
| DE | 102014000842 A1 * | 7/2015 | ......... | B60R 21/0134 |
| DE | 102014110667 A1 | 2/2016 | | |
| EP | 1363800 B1 * | 11/2008 | .......... | B60T 8/17558 |
| WO | 2014/075783 A1 | 5/2014 | | |

OTHER PUBLICATIONS

Written Opinion of the International Searching Authority issued in PCT/EP2016/070813 dated Dec. 2, 2016 6 pages).
German Search Report issued in DE 10 2015 115 135.9 dated Feb. 29, 2016 (10 pages).
Shelby, S.; "Delta-V as a Measure of Traffic Conflict Severity"; 3rd International Conference on Road Safety and Simulation, Sep. 14-16, 2011 (20 pages).
Wenzel, T.: "Analysis of the Relationship Between Vehicle Weight/ Size and Safety, and Implications for Federal Fuel Economy Regulation" Final Report prepared for the Office of Energy Efficiency and Renewable Energy, US Department of Energy, Mar. 2010 (49 pages).
Marc M. Muntzinger, M. Aeberhard, et al. "Reliable Automotive Pre-Crash System with Out-of-Sequence Measurement Processing"; 2010 IEEE Intelligent Vehicles Symposium, San Diego, CA, USA; Jun. 21-24, 2010; pp. 1022-1027 (6 pages).
H. Asada, K. Nawata et al.; "The Study for Dynamic Evaluation Method for Assessing Whiplash-Associated Disorder in Rear Impact"; Japan Automobile Research Institute (JARI) (on behalf of the JAMA Rear-impact Neck Injury Evaluation Sub-Group); paper No. 09-0302 (9 pages).
K. Jelen, O. Fanta et al.; "Whiplash Injury and Head Injury Criterion during Deceleration"; Transactions on Transport Sciences; vol. 4; 2011; pp. 217-224 (8 pages).
E. Tomasch, S Schick et al.; "Neck injury Protection: Potential Cost Savings and Improved Seat Evaluation"; Transport Research Arena 2014, Paris (10 pages).

* cited by examiner

METHOD FOR DETERMINING THE SEVERITY OF A POSSIBLE COLLISION BETWEEN A MOTOR VEHICLE AND ANOTHER VEHICLE, CONTROL APPARATUS, DRIVER ASSISTANCE SYSTEM AND A MOTOR VEHICLE

The present invention relates to a method for determining the severity of a possible collision between a motor vehicle and another vehicle, in which sensor data which describes the other vehicle is received from at least one sensor of the motor vehicle by means of a control apparatus, a change in velocity which describes a difference between a velocity of the motor vehicle before the collision and a collision velocity of the motor vehicle after the collision is determined on the basis of the sensor data, and the severity of the possible collision is determined on the basis of the determined change in velocity. Furthermore, the present invention relates to a control apparatus for a motor vehicle. In addition, the present invention relates to a driver assistance system for a motor vehicle. Finally, the present invention relates to a motor vehicle having such a driver assistance system.

The emphasis here is, in particular, on determining the severity of a possible collision between a motor vehicle and an object, in particular another vehicle. For this purpose, systems in which the other vehicle with which there is a risk of a collision is sensed with a corresponding sensor are known from the prior art. Such a sensor can be configured to determine a distance or a relative position between the motor vehicle and the other vehicle. In addition, the sensor can be configured to determine a relative velocity between the motor vehicle and the other vehicle. Such a sensor can be, for example, a radar sensor which is designed to determine a relative position between the motor vehicle and the other vehicle and/or a relative velocity between the motor vehicle and the other vehicle. On the basis of this data it is then possible to determine a time up to the collision (TTC—Time To Collision) and/or a probability of a collision. Vehicle occupant protection devices of the motor vehicle can then be actuated as a function of this data.

In this respect, U.S. Pat. No. 6,085,151 A describes a collision warning system for a vehicle which comprises a radar sensor. A distance between a target and the motor vehicle can be determined on the basis of the sensor data which is acquired by the radar sensor. Moreover, a size of the target can be estimated.

Furthermore, DE 199 33 782 A1 describes a method for avoiding rear-end accidents by observing the traffic space to the rear of a first motor vehicle. In the method, the actual velocity of the first motor vehicle is determined, the relative velocity between the first motor vehicle and a second motor vehicle located behind the first motor vehicle is determined, the distance between the first and second motor vehicle is determined, and the time which remains until the two vehicles would collide with one another is calculated. In addition, in this context a predefined value for the deceleration of the second vehicle is taken into account.

Furthermore, it is known to estimate a change in velocity which describes the difference between the current velocity before the collision and a collision velocity after the collision, and to determine the severity of the crash on the basis of the change in velocity. This is described, for example, in the article: "Delta-V as a measure of traffic conflict severity" by S. G. Shelby, 3rd International Conference on Road Safety and Simulation, Sep. 14-16, 2011, USA.

The object of the present invention is to indicate a solution permitting the severity of a possible collision between a motor vehicle and another vehicle to be determined more reliably.

This object is achieved according to the invention by means of a method, by means of a control apparatus, by means of a driver assistance system and by means of a motor vehicle having the features according to the respective independent claims. Further advantageous developments of the present invention are the subject matter of the dependent claims, the description and the figures.

A method according to the invention serves to determine the severity of a possible collision between a motor vehicle and another vehicle. In this context, sensor data which describes the other vehicle is received from at least one sensor of the motor vehicle by means of a control apparatus, a change in velocity which describes a difference between a velocity of the motor vehicle before the collision and a collision velocity of the motor vehicle after the collision is determined on the basis of the sensor data, and the severity of the possible collision is determined on the basis of the determined change in velocity. Furthermore, a mass of the other vehicle is estimated by means of the control apparatus on the basis of the sensor data, and the severity of the possible collision is additionally determined on the basis of the estimated mass.

By using the method the severity of a possible collision or of a possible crash between a motor vehicle and another object in the surroundings of the motor vehicle, in particular another vehicle, is to be determined. For this purpose, sensor data which describes, in particular, the surroundings of the motor vehicle is acquired with a sensor of the motor vehicle. In this context, the sensor data describes the at least one other vehicle in the surroundings of the motor vehicle. The sensor can be configured, for example, to emit a transmission signal which is then reflected by the other vehicle and passes back to the sensor. In this context there may also be provision that measurement cycles in which in each case a transmission signal is emitted and the transmission signal which is reflected by the other vehicle is received again are continuously carried out with the sensor. The sensor can be, in particular, a radar sensor. Basically, the sensor can also be a lidar sensor, a laser scanner or an ultrasonic sensor. The at least one sensor is connected to a control apparatus for the purpose of transmitting data. This control apparatus can be a corresponding computing apparatus, a digital signal processor, a microprocessor or the like. In particular, the control apparatus can be an electronic control unit of the motor vehicle. On the basis of the sensor data which is transmitted to the control apparatus by the at least one sensor, the control apparatus can determine, for example, a relative velocity between the motor vehicle and the other vehicle. For this purpose, the control apparatus can evaluate the respective distance between the motor vehicle and the other vehicle at a plurality of successive points in time. The control apparatus can also determine the relative velocity between the motor vehicle and the other vehicle directly from the sensor data. For this purpose, for example a Doppler shift can be determined between the emitted transmission signal and the transmission signal which is reflected by the object. In addition, the control apparatus is configured to determine or estimate a change in velocity on the basis of the sensor data. The change in velocity describes the difference between the velocity of the motor vehicle before the collision and the collision velocity of the motor vehicle after the collision. By means of the control apparatus it is possible to determine, for example, the relative position and/or a difference in velocity between the motor vehicle and the other vehicle on the basis of the sensor data. On this basis the change in velocity can then be estimated. The control apparatus can then determine the severity of the possible collision on the basis of the change in velocity. This information can be used, for example, to actuate corresponding vehicle occupant protection apparatuses for protecting the vehicle occupant when the collision occurs.

According to the present invention there is then provision that a mass of the other vehicle is additionally estimated by means of the control apparatus on the basis of the sensor data. This estimated mass is additionally taken into account during the determination of the severity of the possible collision. This is based on the realization that the mass of the other vehicle with which the motor vehicle will, under certain circumstances collide, has a considerable influence on the severity of the possible collision. The mass of the other vehicle additionally has a clear effect on the change in velocity. This applies both to the case in which the motor vehicle collides with the rear of the other vehicle and to the case in which the other vehicle collides with the rear of the motor vehicle. If, for example, the other vehicle collides with the rear of the motor vehicle, the severity of the collision differs clearly as a function of the mass of the other vehicle. If the other vehicle is, for example, a motorcycle, the severity of the collision given the same relative velocity is significantly less than if the other motor vehicle is a lorry. In addition, the impetus which the other vehicle applies to the motor vehicle can be determined on the basis of the estimated mass of the other vehicle. Therefore, the severity of the possible collision can be determined more precisely, and vehicle occupant protection apparatuses can therefore be actuated more reliably.

Preferably, the sensor data describes at least one outer surface of the other vehicle, by means of the control apparatuses external dimensions of the other vehicle are determined on the basis of the sensor data, and the mass of the other vehicle is estimated on the basis of the determined external dimensions of the other vehicle. By using a sensor which is embodied, for example, as a radar sensor it is possible to sense the outer surfaces or at least those outer surfaces which face the sensor. In this context there may be provision that a plurality of successive measurement cycles are carried out in each of which the outer surfaces of the other vehicle are sensed. On the basis of the sensor data it is then possible to determine the external dimensions of the other vehicle, for example the length, the width and/or the height of the other vehicle can be determined or estimated on the basis of the sensor data. Furthermore, there may be provision that the volume and/or a base surface or a contact surface of the other vehicle is estimated. On the basis of this data it is then possible to estimate the mass of the motor vehicle. In the article "Analysis of the relationship between vehicle weight/size and safety, and implications for federal fuel economy regulation" by T. Wenzel, 2010, it is described that the mass of a motor vehicle can be inferred from its external dimensions. For this purpose, corresponding values for the mass can be stored, for example, in a corresponding memory unit or a look-up table. The mass of the other vehicle can therefore be estimated.

According to a further embodiment, the other vehicle is assigned to a predetermined vehicle class on the basis of the sensor data, and the mass of the other vehicle is determined on the basis of the assigned vehicle class. Alternatively or additionally there can be provision that a classification of the motor vehicle is made on the basis of the sensor data. This classification can be carried out, for example, on the basis of the external dimensions and/or on the basis of characteristic features of the other vehicle which have been determined on the basis of the sensor data. For example, the other vehicle can be assigned to the motor cycle class, motor vehicle class or lorry class. There may also be provision here that typical masses for the vehicle classes are stored in a corresponding memory unit or look-up table of the control apparatus. If it is not at all possible to determine the external dimensions of the motor vehicle and/or to classify the motor vehicle, there may also be provision that a predetermined standard value is assigned to the mass of the motor vehicle.

According to a further embodiment, the velocity of the motor vehicle before the collision and/or a mass of the motor vehicle are/is determined, and the severity of the possible collision is determined on the basis of the determined velocity and/or the mass of the motor vehicle. The current velocity of the motor vehicle can be acquired by means of the control apparatus, for example on the basis of the data of a velocity sensor of the motor vehicle. The mass of the motor vehicle can be stored, for example, in the memory unit of the control apparatus. In addition, there can be provision that a current velocity of the other vehicle is determined on the basis of the sensor data. This velocity can additionally be determined from the determined relative velocity and the determined current velocity of the motor vehicle. The respective impetus of the motor vehicle and of the other vehicle, which is respectively the product of the mass and the current velocity, can therefore be determined. Furthermore, the velocity of the motor vehicle and the velocity of the other vehicle after the collision can be determined therefrom. In this context it can be taken into account that the collision partially takes place in an elastic form and partially in an inelastic form. This permits a reliable prediction of the severity of the possible collision.

The mass of another vehicle which is located behind the motor vehicle in the direction of travel of the motor vehicle is preferably determined. In particular, the mass of another vehicle which is located behind the motor vehicle in the direction of forward travel of the motor vehicle is determined. In other words, the severity of a collision during which the other vehicle runs into the motor vehicle from behind is to be determined. This is a case, in particular, of a rear-end accident which is to be investigated. In this context, there is provision, in particular, that the at least one sensor is arranged in a rear area of the motor vehicle. With said sensor it is then possible to determine the relative velocity between the motor vehicle and the other vehicle and/or a relative position between the motor vehicle and the other vehicle. In addition, on the basis of the sensor data it is possible to estimate the mass of the other vehicle behind the motor vehicle. On the basis of the sensor data it is then possible to reliably determine the change in velocity.

According to a further refinement, a relative position and/or a relative velocity between the motor vehicle and the other vehicle are/is determined on the basis of the sensor data, a time period up to a possible collision is determined on the basis of the determined relative position and/or the relative velocity, and the severity of the collision is additionally determined on the basis of the time period. In addition, a difference can be determined between the acceleration of the motor vehicle and the acceleration of the other vehicle. Basically, there may be provision that the relative position, the relative velocity and/or the differences in acceleration are/is determined with respect to two spatial directions. These spatial directions can be assigned, for example, to a longitudinal axis of a vehicle and a transverse axis of a vehicle. On the basis of this data it is also possible to determine a time period up to a possible collision between the motor vehicle and the other vehicle. This time period is also referred to as Time To Collision (TTC). In addition there may be provision that on the basis of the relative position, the relative velocity and/or the differences in acceleration a collision probability is determined which describes how probable a collision between the motor vehicle and the other vehicle is. The severity of the possible collision can therefore be more reliably estimated.

According to a further embodiment, a maximum deceleration of the other vehicle is determined on the basis of the sensor data, and the severity of the possible collision is determined on the basis of the determined deceleration. On the basis of the estimated mass and the relative velocity between the motor vehicle and the other motor vehicle it is possible to estimate whether the collision can be prevented by a braking operation which the other vehicle carries out. In this context, in particular the other vehicle can initially be classified. On the basis of the estimated mass and/or the classification of the other vehicle it is then possible to estimate whether or not a collision can be prevented by a braking operation of the other vehicle.

Furthermore, it is advantageous if a maximum steering lock of the other vehicle is determined on the basis of the sensor data, and the severity of the possible collision is determined on the basis of the determined steering lock. In order to determine the maximum steering lock, it is possible, in particular, initially to carry out the classification of the other vehicle as described above. In this context it is taken into account that, for example, the maximum steering lock in the case of a motorcycle is greater than in the case of a lorry. On the basis of the maximum steering lock it is possible to determine whether the other vehicle which is approaching the motor vehicle from the rear can avoid the motor vehicle by means of a corresponding steering movement. Therefore, during the determination of the severity of the possible collision it is additionally possible to take into account the point that the other vehicle can avoid the motor vehicle by means of the steering movement.

Furthermore, it is advantageous if a multiplicity of impact areas of the motor vehicle are predetermined, and an impact velocity is determined for each of the predetermined impact areas on the basis of the sensor data. In this context there may be provision, in particular, that the rear area of the motor vehicle is divided into a multiplicity of impact areas. For example, the rear area can be divided into three impact areas which are different from one another. On the basis of this sensor data it is possible to determine the relative position between the motor vehicle and the other vehicle and/or the relative velocity. On the basis of this data it is possible to determine an impact probability for each of the impact areas. In this context, the maximum steering lock of the other motor vehicle can continue to be taken into account. Therefore, in addition the impact area against which the other vehicle possibly impacts can be determined. This information can be used, for example, to actuate the vehicle occupant protection apparatuses correspondingly.

A control apparatus according to the invention for a motor vehicle is configured to carry out a method according to the invention. The control apparatus can be formed, for example, by an electronic control unit of the motor vehicle.

A driver assistance system according to the invention for a motor vehicle comprises at least one sensor, in particular one radar sensor, and a control apparatus according to the invention. In this context, the driver assistance system is configured, in particular, to actuate at least one vehicle occupant protection apparatus as a function of the change in velocity which is determined by means of the control apparatus. Basically, the driver assistance system can actuate one or more vehicle occupant protection apparatuses as a function of the severity, determined by the control apparatus, of the possible collision between the motor vehicle and the other vehicle. In this way, injuries to the vehicle occupants can be reliably prevented or at least reduced.

In one embodiment, the driver assistance system is configured to release a brake of the motor vehicle if the determined change in speed exceeds a first threshold value, to actuate a belt pretensioner if the determined change in velocity exceeds a second threshold value, and/or to adapt a position of at least one part of a headrest if the determined change in the velocity exceeds a third threshold value. If the determined change in velocity exceeds the first threshold value, which is assigned, for example, to a minor collision, the brake of the motor vehicle can be released. In this way it is possible to ensure that the motor vehicle can continue to move after the collision. If the change in velocity exceeds a second threshold value, which is relatively high compared to the first threshold value, a belt pretensioner can be actuated. The second threshold value can be assigned, for example, to a medium-severity collision. If the change in velocity exceeds a third threshold value, which is relatively high compared to the second threshold value, a headrest of the motor vehicle or at least one part of the headrest can be pivoted in such a way that it rests against the vehicle occupant's head. The third threshold value can be assigned, for example, to a severe collision. Therefore, in the case of the collision it is possible to ensure that the vehicle occupant's head rests against the headrest and therefore it is possible to avoid a whiplash injury.

Furthermore, there is preferably provision that the driver assistance system is configured to adapt the position of the at least one part of the headrest as a function of the impact probabilities, determined with the control apparatus, for the predetermined impact areas. It is therefore possible to take into account, for example, whether the other vehicle will impact centrally or laterally against the rear of the motor vehicle. The position of at least one part of the headrest can then be adapted as a function of this information. In this way, a whiplash injury of a vehicle occupant can be reliably prevented.

A motor vehicle according to the invention comprises a driver assistance system according to the invention. The motor vehicle is embodied, in particular, as a passenger motor vehicle.

The preferred embodiments which are presented with respect to the method according to the invention, and the advantages thereof, apply correspondingly to the control apparatus according to the invention, the driver assistance system according to the invention and the motor vehicle according to the invention.

Further features of the invention can be found in the claims, the figures and the description of the figures. The features and combinations of features mentioned above in the description as well as those mentioned below in the description of the figures and/or features and combinations of features shown solely in the figures can be used not only in the respectively specified combination but also in other combinations or alone without departing from the scope of the invention. Embodiments of the invention which are not explicitly shown or explained in the figures but which are apparent from and can be generated by separate combinations of features on the basis of the explained embodiments are therefore also to be considered as being included and disclosed.

Embodiments and combinations of features which therefore do not have all the features of an originally formulated independent claim are therefore also to be considered as being disclosed.

The invention will now be explained in more detail on the basis of preferred exemplary embodiments and with reference to the appended drawings, in which.

In the figures, identical and functionally identical elements are provided with the same reference symbols.

Figure 1:
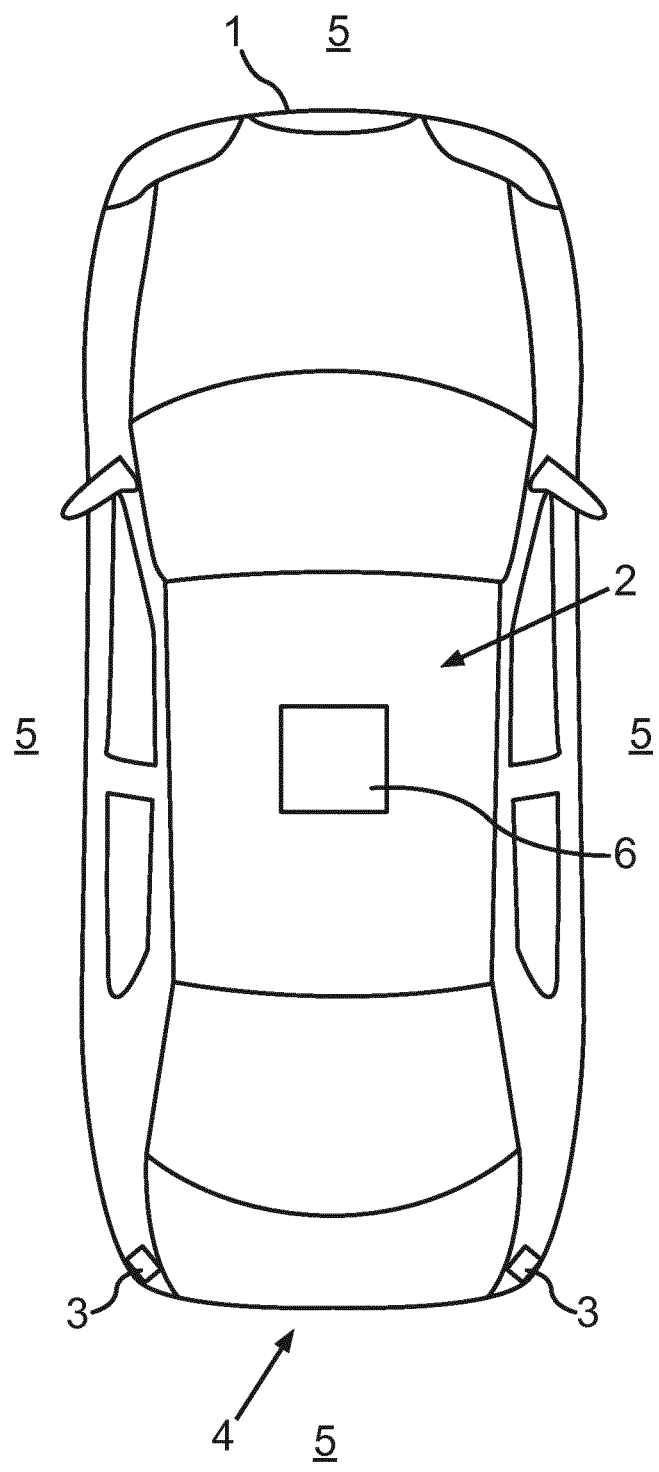
FIG. 1 shows a schematic illustration of a motor vehicle according to an embodiment of the present invention, which motor vehicle has a driver assistance system.

FIG. 1 shows a motor vehicle 1 according to an embodiment of the present invention. The motor vehicle 1 is embodied in the present case as a passenger motor vehicle. The motor vehicle 1 comprises a driver assistance system 2. The driver assistance system 2 comprises at least one sensor 3. In the present exemplary embodiment, the driver assistance system 2 comprises two sensors 3, which are each embodied as radar sensors. In this context, the sensors 3 are arranged in a rear area 4 of the motor vehicle 1. The sensors 3 can be installed, for example, concealed behind a bumper of the motor vehicle 1.

The respective sensors 3 or the radar sensors can be used to emit a transmission signal in the form of electromagnetic radiation. This transmission signal can then be reflected by an object in a surrounding area 5 of the motor vehicle 1. On the basis of the transit time between the emission of the transmission signal and the reception of the reflected transmission signal a distance can then be determined between the motor vehicle 1 and the object. In addition, the sensors 3 can also be configured to determine a relative velocity between the motor vehicle 1 and the object on the basis of a Doppler shift between the emitted transmission signal and the transmission signal which is reflected by the object. The sensors 3 can then be used, in particular, to sense a further vehicle 7 as the object (see FIG. 2).

In addition, the driver assistance system 2 comprises a control apparatus 6 which is formed, for example, by an electronic control unit of the motor vehicle 1. The control apparatus 6 is connected to the sensors 3 in order to transmit data. Corresponding data lines are not illustrated here for the sake of clarity. Therefore, sensor data which describes the object or the other vehicle 7 in the surrounding area 5 can be transmitted from the sensors 3 to the control apparatus 6. The control apparatus 6 can then determine the relative velocity between the motor vehicle 1 and the object on the basis of the sensor data. In addition, the control apparatus 6 can determine a current velocity $V_1$ of the motor vehicle 1. For this purpose, for example corresponding data of a velocity sensor can be transmitted to the control apparatus 6.

Figure 2:
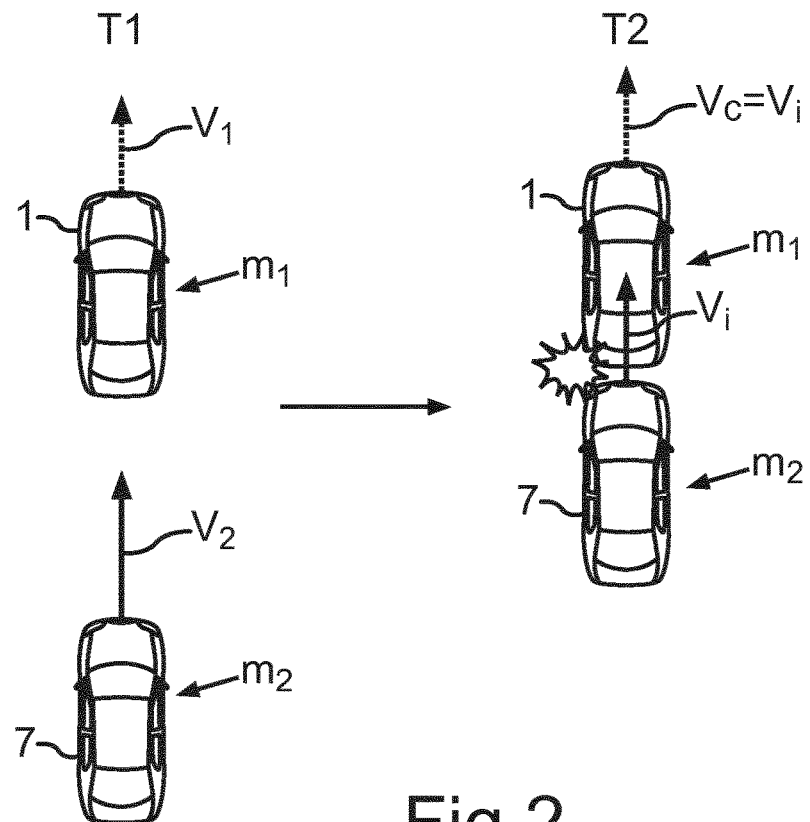
FIG. 2 shows a collision of the motor vehicle with another vehicle, wherein the collision is considered to be an inelastic impact.

The severity of a possible collision between the motor vehicle 1 and the other vehicle 7 is then to be determined using the control apparatus 6 or the driver assistance system 2. In this context, in particular the case is considered in which the other vehicle 7 is located behind the motor vehicle 1 in the direction of travel of the motor vehicle 1. This is illustrated in FIG. 2. At a point in time T1 the other vehicle 7 is located behind the motor vehicle 1. The motor vehicle 1 is moving at the velocity $V_1$ and has a mass $m_1$. The other vehicle 7 is moving with a velocity $V_2$ and has a mass $m_2$. At a point in time T2 a collision occurs between the motor vehicle 1 and the other vehicle 7. In this context, the other vehicle 7 impacts against the rear area 4 of the motor vehicle 1. The collision is considered here to be an inelastic impact. After the collision, both the motor vehicle 1 and the other vehicle 7 have a velocity $V_i$. In this case, the velocity $V_i$ corresponds to a collision velocity $V_c$ which describes the velocity of the motor vehicle 1 after the collision. This velocity $V_i$ can be determined according to the following formula:

$$V_i = \frac{m_1 V_1 + m_2 V_2}{m_1 + m_2}.$$

Figure 3:
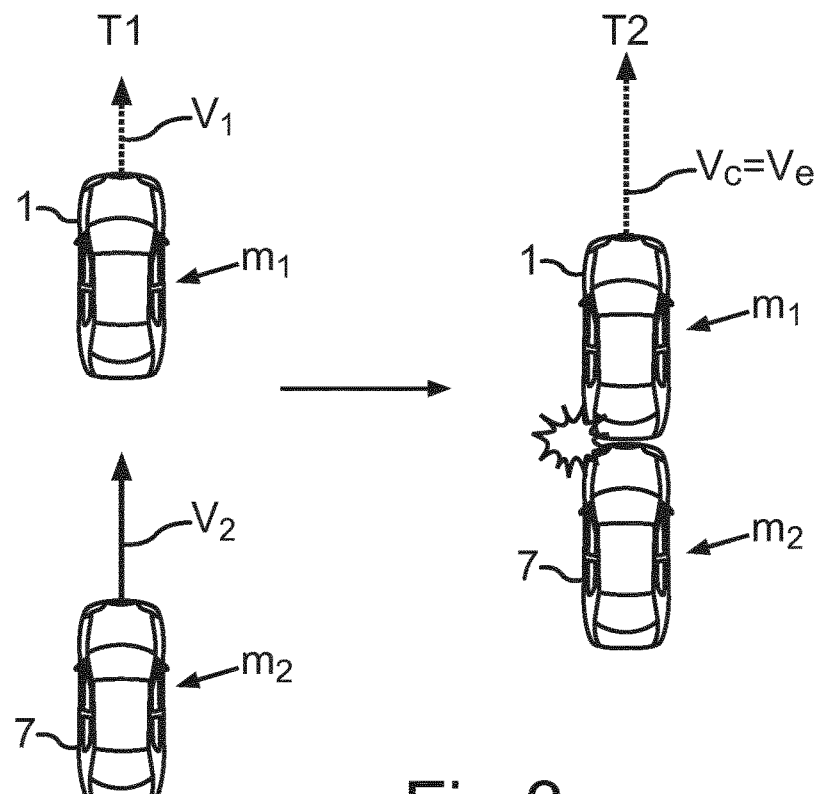
FIG. 3 shows a collision between the motor vehicle and the other vehicle, wherein the collision is considered to be an elastic impact.

In comparison with this, FIG. 3 shows the case in which the collision is considered to be an elastic impact. It is assumed here that the entire impetus is transmitted from the other vehicle 7 to the motor vehicle 1 during the collision. In this context the other vehicle 7 remains stationary and the motor vehicle 1 moves at the velocity $V_e$. Here, the velocity $V_e$ corresponds to the collision velocity $V_c$ of the motor vehicle 1. This velocity $V_e$ can be determined according to the following formula:

$$V_e = \frac{m_1 V_1 + m_2 V_2}{m_1}.$$

Basically, the collision between the motor vehicle 1 and the other vehicle 7 cannot be considered to be an elastic impact nor an inelastic impact. The collision velocity $V_c$ of the motor vehicle 1 after the collision can be determined on the basis of a combination of an elastic impact and an inelastic impact. In this context, studies have shown that collisions at relatively high relative velocities can be considered to be essentially inelastic. At relatively low relative velocities the collision occurs according to an elastic impact. The collision velocity $V_c$ of the motor vehicle 1 after the collision can be determined according to the following formula:

$$V_c = C_f V_i + (1 - C_f) V_e.$$

In this context, $C_f$ describes a parameter which varies as a function of the relative velocity between the motor vehicle 1 and the other vehicle 7. The parameter $C_f$ can be stored, for example, in a memory unit of the control apparatus 6.

In order to be able to determine the severity of the collision between the motor vehicle 1 and the other vehicle 7, a change in velocity is determined. This change in velocity describes the difference in velocity between the motor vehicle 1 before and after the collision. The change in velocity therefore describes the difference between the velocity $V_1$ before the collision and the collision velocity $V_c$. This is done on the basis of the sensor data of the sensors 3. The relative velocity between the motor vehicle 1 and the other vehicle 7 can be determined by means of the control apparatus 6 on the basis of the sensor data. The current velocity $V_1$ of the motor vehicle 1 can be determined using a corresponding velocity sensor of the motor vehicle 1. The velocity $V_2$ of the other vehicle 7 can then be determined from the difference between the relative velocity and the velocity $V_1$ of the motor vehicle 1. The mass $m_1$ of the motor vehicle 1 can be stored, for example, in the control apparatus 6.

In addition, the mass $m_2$ of the other vehicle 7 is estimated. For this purpose, the spatial dimensions of the other vehicle 7 can be determined on the basis of the sensor data. In particular, the length, the width and/or the height of the other vehicle 7 can be determined on the basis of the sensor data. For this purpose, for example chronologically successive measurement cycles can be carried out in which respective outer surfaces of the other vehicle 7 are detected or determined on the basis of the sensor data. Furthermore there can be provision that a classification of the other vehicle 7 is carried out on the basis of the sensor data. In this context, the other vehicle 7 can be assigned, for example, to the motorcycle class, motor vehicle class or lorry class.

When the mass $m_2$ of the other vehicle 7 is estimated, a confidence value can also be specified which describes how reliably the mass m2 has been determined. In this context, it is also possible to take into account, for example, whether it was possible to sense the other vehicle 7 completely or only partially using the sensors 3. For example it is possible to take into account the fact that parts of the other vehicle 7 are concealed by an obstacle. If the confidence value undershoots, for example, a predetermined threshold value, it can be assumed that the mass $m_2$ of the other vehicle 7 cannot be determined reliably. In this case, a standard value is assumed for the mass $m_2$ of the other vehicle 7.

The collision velocity $V_c$ can be determined from the velocity $V_1$ of the motor vehicle 1, the velocity $V_2$ of the other vehicle 7, the mass $m_1$ of the motor vehicle 1 and the mass $m_2$ of the other vehicle 7 on the basis of the above described formula. In turn, the change in velocity can be determined from the collision velocity $V_c$. The severity of the collision can then be estimated on the basis of the change in velocity.

Figure 4:
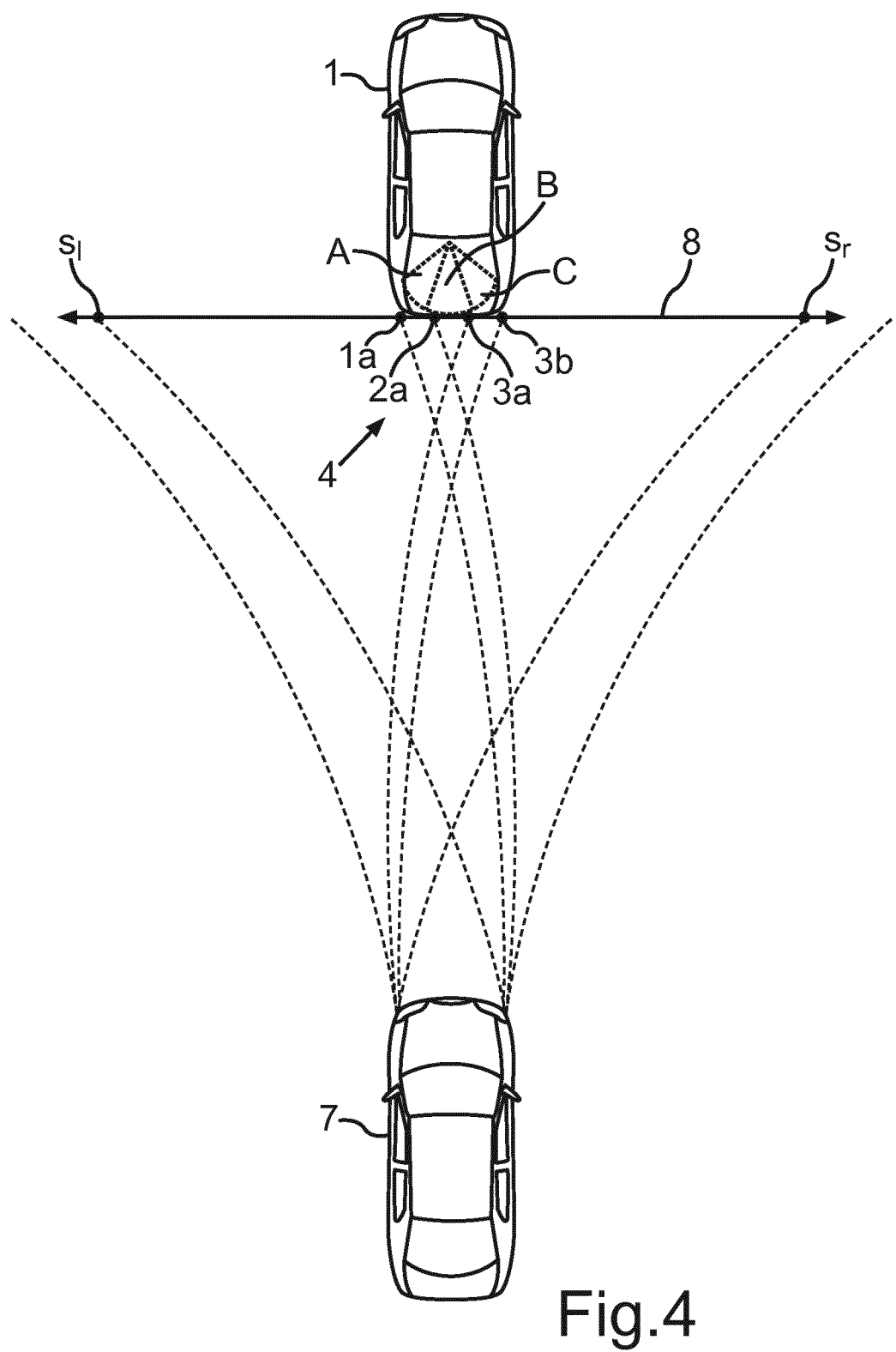
FIG. 4 shows the motor vehicle behind which the other vehicle is located, wherein there is a risk of a collision between the motor vehicle and the other vehicle.

Furthermore, there can be provision that a probability of a collision between the motor vehicle 1 and the other vehicle 7 is determined. For this purpose, a relative position between the motor vehicle 1 and the other vehicle 7 can be determined by means of the control apparatus 6 on the basis of the sensor data. In addition, the relative velocity between the motor vehicle 1 and the other vehicle 7 or the velocity $V_1$ of the motor vehicle 1 and the velocity $V_2$ of the other vehicle 7 can be determined. Furthermore, the current acceleration of the other vehicle 7 can be determined on the basis of the sensor data. On the basis of this data, a chronological duration up to the collision can then be determined. In this context, there can also be provision that a maximum steering lock $s_l$ is determined in a first direction or to the left, and a maximum steering lock $s_r$ is determined in a second direction or to the right, for the other vehicle 7. In order to determine the maximum steering lock $s_l$, $s_r$ it is possible to use the information from the classification of the other vehicle 7. In addition there is, in particular, provision that a maximum deceleration of the other vehicle 7 is determined. It is therefore possible to determine whether the other vehicle 7 can prevent the collision with the motor vehicle 1 through a corresponding steering movement and/or a braking operation. This is illustrated schematically in FIG. 4.

In the rear area 4 of the motor vehicle 1, in addition impact areas A, B, C are also predefined. In this case, a probability of impact is to be determined for each of the impact areas A, B, C. Here, the arrow 8 describes possible points which the other vehicle 7 can intersect during its movement. The arrow 8 extends here along the rear area 4 of the motor vehicle 1, perpendicularly with respect to a longitudinal axis of the motor vehicle 1. A corresponding probability can be used to determine the probability of impact. The probability that the collision will be prevented by a steering movement of the other vehicle 7 can be described according to a normal distribution which extends between the maximum steering locks $s_l$ and $s_r$. In this context, the motor vehicle 1 can be located, for example, in an interval with a deviation of +/−3 σ.

In order to determine the probability of the collision being avoided, the probability distribution function between the point $s_1$ and the point 1a can be integrated. In addition, the probability distribution function between the point 3b and the point $s_r$ can be integrated. The probability of the collision being avoided or not taking place is obtained from the sum of these two areas. In addition, the probability distribution function between point 1a and point 2a can be integrated in order to determine the probability of an impact for the impact area A. The probability of an impact for the impact area B can be determined by integrating the probability distribution function between the points 2a and 3a. The probability of an impact for the impact area C can be determined by integrating the probability distribution function between the areas 3a and 3b.

Corresponding vehicle occupant protection apparatuses can be actuated using the driver assistance system 2. In this context, the vehicle occupant protection apparatuses can be actuated as a function of the determined change in velocity. If the change in velocity exceeds a first threshold value, the brake of the motor vehicle 1 can, for example, be released. In this case, a minor collision has occurred. If the change in velocity exceeds a second value, a belt pretensioner can be actuated. In this case, a medium-severity collision has occurred. If the change in velocity exceeds a third threshold value, at least one part of a headrest can be adapted, with the result that the latter supports the head of a vehicle occupant. In this context, a severe collision has occurred. In this context, there may be provision, for example, that the position of the at least one part of the headrest is determined as a function of the probabilities of impact for the impact areas A, B, C. In this case, a whiplash injury can be reliably avoided.

The determination of the severity of the collision between the motor vehicle 1 and the other vehicle 7 is described here for the case in which the other vehicle 7 impacts against the rear area 4 of the motor vehicle 1. The principle here can be extended to other types of collisions between the motor vehicle 1 and the other vehicle 7. For example, the sensors 3 can be arranged in such a way that they can also monitor an area in front and/or an area to the side of the motor vehicle 1. Basically, the method can also be used to actuate other vehicle occupant protection apparatuses such as, for example, airbags.

The invention claimed is:

1. A method for protecting vehicle occupants in a potential collision between a motor vehicle and another vehicle, comprising:
   receiving sensor data which describes the another vehicle from at least one sensor of the motor vehicle;
   determining a maximum steering lock of the another vehicle based on sensor data;
   determining a multiplicity of impact areas on the another vehicle and a probability of impact for each of the multiplicity of impact areas;
   determining a change in velocity which describes a difference between a velocity ($V_1$) of the motor vehicle before the collision and a collision velocity ($V_c$) of the motor vehicle after the collision based on the sensor data;

determining a severity of a possible collision based on the determined change in velocity;

releasing a brake of the motor vehicle when the determined severity exceeds a first threshold value;

actuating a belt pretensioner when the determined severity exceeds a second threshold value; and pivoting at least one part of a headrest of a vehicle when the determined severity exceeds a third threshold value, wherein the headrest is pivoting based on the probability of impact for each of the determined multiplicity of impact areas, and wherein the probability of impact for each of the determined multiplicity of impact areas is determined based on the maximum steering lock and a probability distribution function, and wherein a mass of the another vehicle is estimated by a control apparatus based on the sensor data, and wherein the severity of the possible collision is additionally determined based on the estimated mass.

2. The method according to claim 1, wherein the sensor data describes at least one outer surface of the another vehicle wherein external dimensions of the another vehicle are determined based on the sensor data, and the mass of the another vehicle is estimated based on the determined external dimensions of the another vehicle.

3. The method according to claim 1, wherein the another vehicle is assigned to a predetermined vehicle class based on the sensor data, and the mass of the another vehicle is determined based on the predetermined assigned vehicle class.

4. The method according to claim 1, wherein the velocity ($V_1$) of the motor vehicle before the collision and/or a mass of the motor vehicle are/is determined, and the severity of the possible collision is determined based on the determined velocity ($V_1$) and/or the mass of the motor vehicle.

5. The method according to claim 1, wherein the mass of the another vehicle which is located behind the motor vehicle in a direction of travel of the motor vehicle is determined.

6. The method according to claim 1, wherein a relative position and/or a relative velocity between the motor vehicle and the another vehicle are/is determined based on the sensor data, a time period up to the possible collision are/is determined based on the determined relative position and/or the relative velocity, and the severity of the possible collision is determined based on the time period.

7. The method according to claim 1, wherein a maximum deceleration of the another vehicle is determined based on the sensor data, and the severity of the possible collision is determined based on the determined deceleration.

8. The method according to claim 1, wherein the severity of the possible collision is determined based on the determined steering lock.

9. A control apparatus for a motor vehicle, the control apparatus comprising:
a processor configured to:
receive sensor data which describes an another vehicle from at least one sensor of the motor vehicle;
determine a maximum steering lock of the another vehicle based on sensor data;
determine a multiplicity of impact areas on the another vehicle and a probability of impact for each of the multiplicity of impact areas;
determine a change in velocity which describes a difference between a velocity (V) of the motor vehicle before a collision and a collision velocity (V) of the motor vehicle after the collision based on the sensor data;
determine a severity of a possible collision based on the determined change in velocity;
release a brake of the motor vehicle if the determined severity exceeds a first threshold value;
actuate a belt pretensioner if the determined severity exceeds a second threshold value; and
pivot at least one part of a headrest of a vehicle if the determined severity exceeds a third threshold value,
wherein the headrest is pivoted based on the probability of impact for each of the determined multiplicity of impact areas, and
wherein the probability of impact for each of the determined multiplicity of impact areas is determined based on of the maximum steering lock and a probability distribution function, and
wherein a mass of the another vehicle is estimated by the control apparatus based on the sensor data, and
wherein the severity of the possible collision is additionally determined based on the estimated mass.

10. A driver assistance system for a motor vehicle comprising:
at least one radar sensor; and
a control apparatus configured to:
receive sensor data which describes an another vehicle from the at least one sensor of the motor vehicle;
determine a maximum steering lock of the another vehicle based on sensor data;
determine a multiplicity of impact areas on the another vehicle and a probability of impact for each of the multiplicity of impact areas;
determine a change in velocity which describes a difference between a velocity ($V_1$) of the motor vehicle before a collision and a collision velocity ($V_c$) of the motor vehicle after the collision based on the sensor data;
determine a severity of a possible collision based on the determined change in velocity;
release a brake of the motor vehicle if the determined severity exceeds a first threshold value;
actuate a belt pretensioner if the determined severity exceeds a second threshold value; and
pivot at least one part of a headrest of a vehicle if the determined severity exceeds a third threshold value,
wherein the headrest is pivoted based on the probability of impact for each of the determined multiplicity of impact areas, and
wherein the probability of impact for each of the determined multiplicity of impact areas is determined based on the maximum steering lock and a probability distribution function, and
wherein a mass of the another vehicle is estimated by the control apparatus based on the sensor data, and
wherein the severity of the possible collision is additionally determined based on the estimated mass.

11. The method according to claim 1, wherein the probability distribution function is a normal distribution function.

12. The method according to claim 1, wherein the motor vehicle is located in an interval of a deviation of $+/-3\sigma$ based on the probability distribution function.

* * * * *